(12) United States Patent
Kendall

(10) Patent No.: US 11,477,965 B2
(45) Date of Patent: Oct. 25, 2022

(54) SECURING DEVICE FOR ANIMAL CHEW

(71) Applicant: PUP DOG, LLC, Cedar Park, TX (US)

(72) Inventor: John Kirby Kendall, Cedar Park, TX (US)

(*) Notice: Subject to any disclaimer, the term of this patent is extended or adjusted under 35 U.S.C. 154(b) by 473 days.

(21) Appl. No.: 16/620,943

(22) PCT Filed: Jan. 27, 2018

(86) PCT No.: PCT/US2018/015623
§ 371 (c)(1),
(2) Date: Dec. 10, 2019

(87) PCT Pub. No.: WO2018/144349
PCT Pub. Date: Aug. 9, 2018

(65) Prior Publication Data
US 2020/0196574 A1    Jun. 25, 2020

Related U.S. Application Data

(60) Provisional application No. 62/452,857, filed on Jan. 31, 2017.

(51) Int. Cl.
*A01K 15/02* (2006.01)
(52) U.S. Cl.
CPC .................. *A01K 15/026* (2013.01)
(58) Field of Classification Search
CPC ............ A01K 15/025–026; A01K 5/015
USPC ....................................................... 119/709
See application file for complete search history.

(56) References Cited

U.S. PATENT DOCUMENTS

| | | | | |
|---|---|---|---|---|
| 4,825,812 A | * | 5/1989 | Visalli | A01K 15/026 |
| | | | | 119/64 |
| 5,277,147 A | * | 1/1994 | Dupuis | A01K 39/0106 |
| | | | | 119/52.2 |
| 5,894,815 A | * | 4/1999 | Hamilton | A01K 15/025 |
| | | | | 119/61.2 |
| 6,076,486 A | | 6/2000 | Oliano | |
| 6,701,598 B2 | | 3/2004 | Chen | |
| 7,270,085 B2 | * | 9/2007 | Wolfe, Jr. | A01K 15/026 |
| | | | | 119/709 |
| 8,087,387 B2 | * | 1/2012 | Gamble | A01K 15/026 |
| | | | | 119/707 |
| 9,961,880 B2 | * | 5/2018 | Simon | A01K 15/025 |

(Continued)

FOREIGN PATENT DOCUMENTS

| | | | | | |
|---|---|---|---|---|---|
| CN | 104705208 A | * | 6/2015 | | A01K 15/025 |
| DE | 202005019975 U1 | * | 5/2006 | | A01K 15/02 |
| GB | 2532578 A | * | 5/2016 | | A01K 15/025 |

OTHER PUBLICATIONS

International Search Report of the International Searching Authority (ISA/US) dated May 30, 2018 in International PCT Application No. PCT/US2018/015623 filed on Jan. 28, 2018.

*Primary Examiner* — Peter M Poon
*Assistant Examiner* — Morgan T Jordan

(57) ABSTRACT

A securing device that secures an animal chew to prevent animal choking. A chew with one or more boreholes may be inserted into the cavity. A pin is inserted, through the body until it passes through the borehole. A latch obstructs the head of the pin so that the animal cannot work the pin free while enjoying the chew. To remove the pin, the animal's caretaker can apply force to the end of the pin to push it free past the latch.

11 Claims, 13 Drawing Sheets

(56) References Cited

U.S. PATENT DOCUMENTS

| | | | |
|---|---|---|---|
| 2004/0134446 A1* | 7/2004 | Keller | A01K 15/026 |
| | | | 119/707 |
| 2006/0134278 A1* | 6/2006 | Miller | A01K 15/026 |
| | | | 426/132 |
| 2006/0213454 A1* | 9/2006 | Wolfe, Jr. | A01K 15/026 |
| | | | 119/709 |
| 2006/0225667 A1 | 10/2006 | Handelsman et al. | |
| 2009/0078214 A1* | 3/2009 | Mann | A01K 15/025 |
| | | | 119/707 |
| 2009/0095231 A1* | 4/2009 | Axelrod | A01K 15/026 |
| | | | 119/709 |
| 2013/0118417 A1* | 5/2013 | Teconchuk | A01K 15/026 |
| | | | 119/710 |
| 2013/0247836 A1 | 9/2013 | Axelrod et al. | |
| 2014/0345532 A1* | 11/2014 | Valle | A01K 15/026 |
| | | | 119/51.01 |
| 2016/0106068 A1* | 4/2016 | Axelrod | A01K 15/026 |
| | | | 119/710 |
| 2016/0113243 A1* | 4/2016 | Mullin | A01K 5/00 |
| | | | 119/709 |
| 2016/0255813 A1* | 9/2016 | Wolfe, Jr. | A01K 5/0114 |
| 2018/0035644 A1* | 2/2018 | Wilson | A01K 15/026 |
| 2018/0070560 A1* | 3/2018 | Gelardi, II | A63B 43/06 |
| 2019/0000040 A1* | 1/2019 | McIlvenna | A01K 15/026 |
| 2020/0154676 A1* | 5/2020 | Walt | B65D 83/0016 |

\* cited by examiner

SECURING DEVICE FOR ANIMAL CHEW

The present application claims priority from U.S. Provisional Patent Application Ser. No. 62/452,857, filed 31 Jan. 2017. The content of the above-identified patent application is hereby incorporated by reference herein in its entirety.

FIELD OF THE INVENTION

The invention generally relates to a device that secures an animal chew such that the animal is prevented from potentially choking on the last portion of the chew.

BACKGROUND

Animal chews are items given to an animal (primarily dogs) in order to be chewed by the animal. Chews are comprised of many different materials, but this invention is focused on edible materials that are consumed by the animal. The chews may be made from rawhide, compressed rawhide, jerkys, bully sticks, dried tendons, ears, and other edible/consumable materials.

While chews are healthy and enjoyable for animals, there is evidence that the final portion of the chew may be hazardous. The animal may choke on the final portion if it is small enough to swallow yet large enough to become lodged in the esophagus. Because of concerns with chew safety, many users cannot let their animal enjoy a chew unsupervised.

A number of products exist or are described that control how an animal can consume a chew. Most are designed to mount a chew in the body such that the animal eats the chew slower than eating the chew alone. The chews may be mounted by adhesives or by friction within the body of the product. For example, U.S. Pat. No. 5,947,061 uses resilient gripping means to mount a chew that is partially inserted into the hollow body. However, as the chew is consumed two things can happen to the portion of the chew in the product interior: 1) the dog can pull the remaining chew out of the product, and 2) the chew can break and the remaining chew falls out of a hole in the product. In either scenario, the dog now has access to fragment of chew that the dog can choke on.

PetSafe brand products rely on the chew being formed in the shape of a large diameter flat ring (like a very large metal washer). Two nylon ends are then screwed together sandwiching the rings on a center shaft. A major limitation of this product is that it cannot use standard column-shaped chews such as rolled rawhide or bully sticks.

To fill the market gap for using standard-shaped chews, a new product was launched in 2014 called Scrooball by UpDog. To use, a chew was inserted into a rubber sleeve which was then screwed down to clamp on the chew (like a compression fitting). By 2016 the Scrooball is no longer available. In this inventor's experience, the compressing action of the rubber sleeve did not provide enough force to prevent an aggressive dog from pulling the chew free of the device.

A German patent (DE102014106385) for BoneGuard describes a threaded thumb screw that is passes through a borehole in the chew. The screw passes through the borehole in the chew and into a threaded nut on the opposite side of the chew holding body. Similarly, U.S. Pat. No. 6,076,486 illustrates a bolt/threaded rod that secures through a borehole in the chew, but similar to '385 it requires that the bolt be fixedly attached to the opposing bolt hole (e.g. threaded into).

Even with these examples, there is no chew holder that uses a pin to secure a chew, wherein the pin is demonstrably secured in the chew holder without using a threaded rod/bolt/screw. Since a threaded pin presents practical problems in a device that is made to be chewed, there is still a commercial need for an invention that secures the last portion of a chew so that there is significantly reduced risk that the animal can choke. This invention addresses this market need.

SUMMARY OF INVENTION

The present invention is directed to methods and elements for a securing device for an animal chew with a borehole. The device is comprised of a body around a cavity where a chew (possessing a borehole) may reside. There are opposing passageways (e.g. holes) though the body along an axis that also passes through the borehole. A pin is inserted through the passageways and borehole, and an internal latch secures the head of the pin. For pin removal, the latch can be moved aside by pressing on the insertion end of the pin, or more preferred, the latch can be moved aside the head, so that a lesser force can be used to move the pin free. To make the device easiest to use, the latch system is duplicated in both passageways so that the pin can be inserted from either side of the device. The chew can enter from either face of the device in one embodiment or the device may have one face closed possibly in the shape of a handle, and the chew may possess more than one borehole so that it can be secured onto more than one device. The ends of the pin should be recessed into the passageways to prevent damage from chewing. The present invention is also directed to a method for securing the chew by placing a chew with a borehole into the cavity; inserting a pin through the first passageway, then the borehole, and into the second passageway; so that the head of the pin becomes engaged by a latch—that the user can move aside when the pin needs to the removed to install a fresh chew.

DETAIL DESCRIPTION

It will be apparent to those skilled in the art that various additions, substitutions and modifications can be made to the described embodiments without departing from the spirit and scope of the invention as defined in the claims and following description. Additionally, elements and functions of the claims should be considered inclusive.

A variety of experiments were performed during development of the securing device to insure that the invention would be acceptable to the consumer/user. These experiments and prototypes are below with descriptions of successes and failures. Most experiments were performed using an approximately 50 pound dog as the chewing animal.

The most important requirement of the device is that it prevents an animal from choking by attempting to swallow the chew. Commercial offerings and experiments show that constraint is best met by using material to surround part of the chew with a pin or bolt passing through the chew. For the purposes of this description, the terms "around", "surround", and the like do not necessarily mean that the body is a complete ring. Rather, testing has shown that a C-shaped body will suffice to hold the pin mechanism in place and let the animal safely consume the chew.

Attempts were made to affix a rawhide chew to a ring-shaped rubber device based on friction between the chew and the rubber. A recessed metal compression clamp was used to compress the rubber body to the rawhide. In both cases the animal was able to pull the chew free from the rubber. These results are seen as confirming at least one reason why a compression-based system did not prove commercially viable.

Another experiment used a metal screw (deeply countersunk into the rubber) to hold a rawhide chew into a ring-shaped prototype. The experiment was a success in that the animal consumed the chew down to the last portion and then was not able to pull free or consume the last portion. However, since the screw required a tool and the screw was metal, this approach also did not meet other constraints. Therefore, a screw-based approach is not suitable.

For clarity of description and as illustrated, different numbers are used to denote the same element. For example, there are three different numbers (10, 13, and 15) used to denote the "pin" element. That is because the three numbers illustrate different visual and functional forms of the pin. However, during most of the description, the main form "pin 10" is used with other forms of the pin may be suitable. Therefore, the use of a specific element form (e.g., "pin 10") should be considered non-limiting to that specific form when other forms may be suitable.

Figure 11:
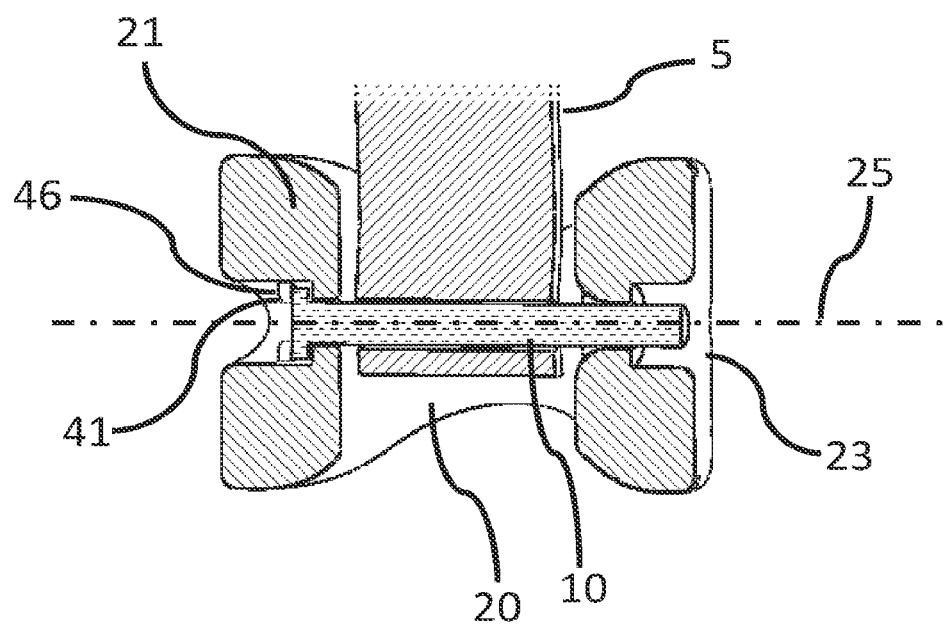
FIG. 11 is a cross-sectional view of the elements and a chew after assembly.

Ring-shaped prototypes were made where pin 10 extended along axis 25 from one side of body 21, through first passageway 22, through borehole 4 drilled in chew 5, and into passageway 23 on the opposing side of body 21 (see FIG. 11). This securing pin 10 design proved to be the successful approach of this invention. Details of this invention are described below.

Figure 1:
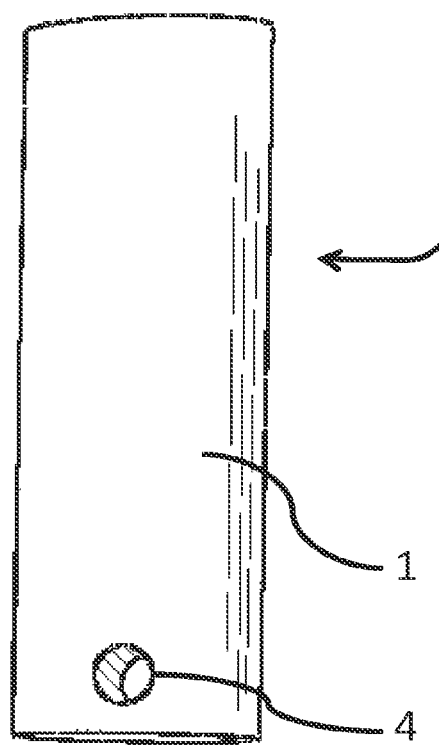
FIG. 1 is a view of a chew with a borehole.
Figure 2:
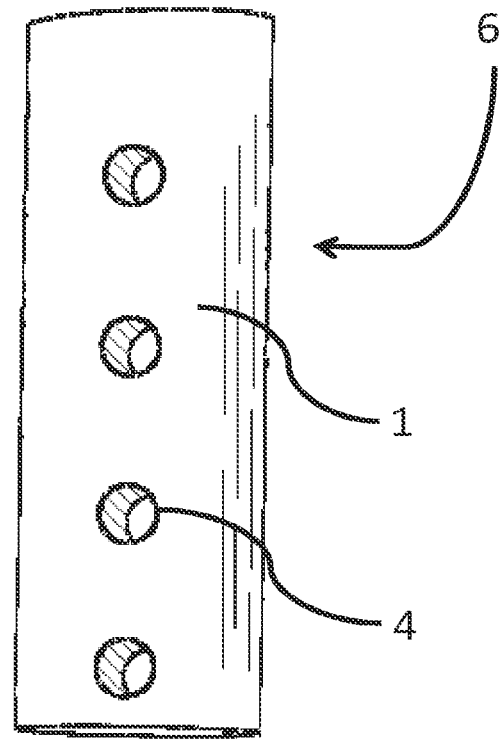
FIG. 2 is a view of a chew with multiple boreholes.
Figure 3:
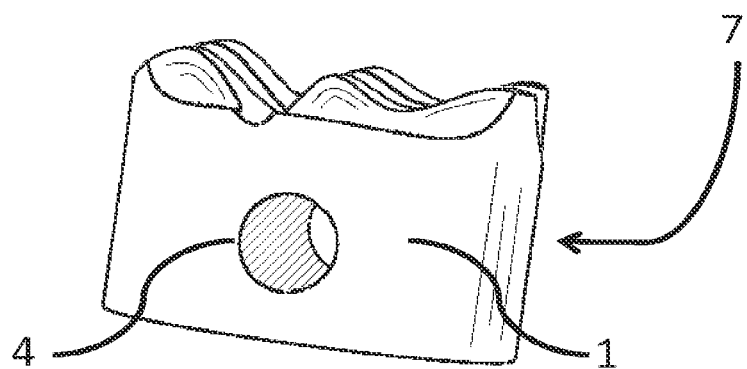
FIG. 3 is a view of a chew-last-portion.

Edible material 1 for a "chew" can be made from a number of non-limiting materials including, rawhides, jerkys, bones, and sticks. FIG. 1 illustrates chew 5 made out of edible material 1 and borehole 4. Borehole 4 can be placed anywhere along the length of 1. Chew-multiborehole 6 is presented in FIG. 2, and it possesses a number of boreholes 4. Boreholes 4 may be in alignment as illustrated, or they may be at orthogonal angles. FIG. 3 illustrates chew-last-portion 7 that is generally described as edible material 1 that is small enough to present a choking hazard. Chew-last-portion 7 may be torn out in safe-sized shreds by the animal—as has been demonstrated by numerous prototypes and experiments.

Figure 4:
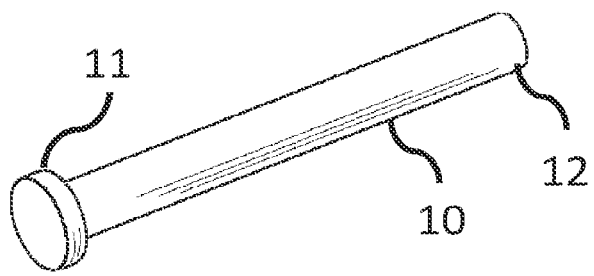
FIG. 4 is an isometric view of a pin.
Figure 5:
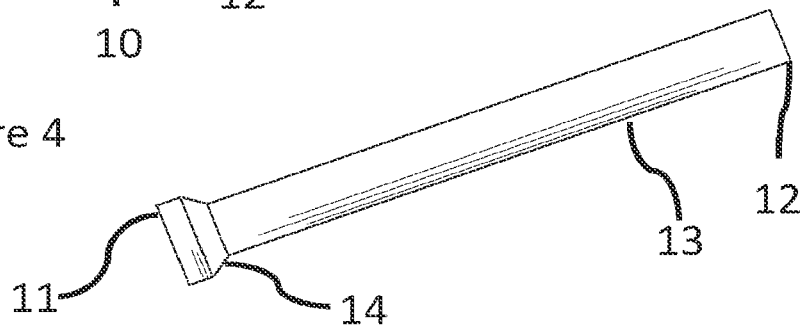
FIG. 5 is a side view of a pin with a taper.
Figure 6:
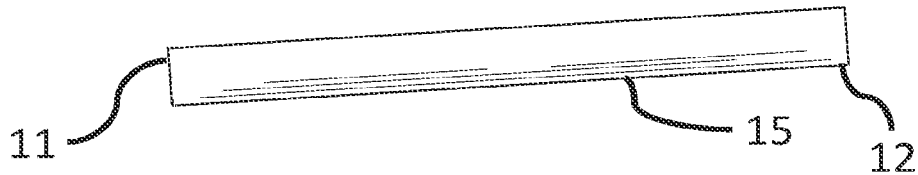
FIG. 6 is a side view of a pin with a flush head.

The element that passes though borehole 4 is termed the "pin". Three different, non-limiting examples of the pin are pin 10 (FIG. 4), pin-tapering 13 (FIG. 5), and pin-flush-head 15 (FIG. 6). Pin 10 is presented with a generally flat, angular head 11. On the opposite end of pin 10 from head 11 is pin insertion end 12. Insertion end 12 enters body 21 of the device first, and it may be flat, tapered, or otherwise shaped. Pin-tapering 13 possesses tapered portion 14 that makes a smoother transition between the length of pin-tapering 13 and head 11. While pin 10 and pin-tapering 13 can with some designs be used interchangeable, the addition of tapered portion 14 is preferable for many latch designs. A third type, pin-flush-head 15, has the advantage for some designs that head 11 is flush with the length of pin-flush-head 15. As illustrated, pin-flush-head 15 is reversible and either end can be head 11 or insertion end 12. Another example not illustrated is where head 11 possesses a non-flat end face. The face of head 11 may also possess grooves, tabs, or extensions that make change how the user can grip head 11, or how head 11 is latched. While the pin is generally considered to be round, other shapes such as rectangular, square, oval, hexagonal, and the like are suitable for this invention.

Figure 7:
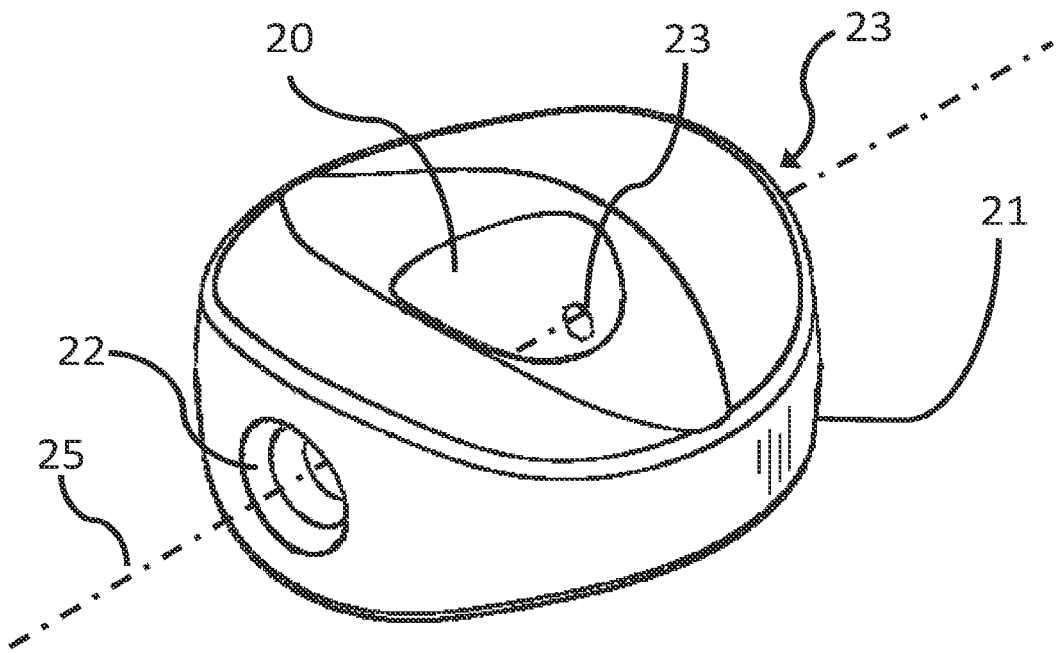
FIG. 7 is an isometric view of a body of the device.
Figure 8:
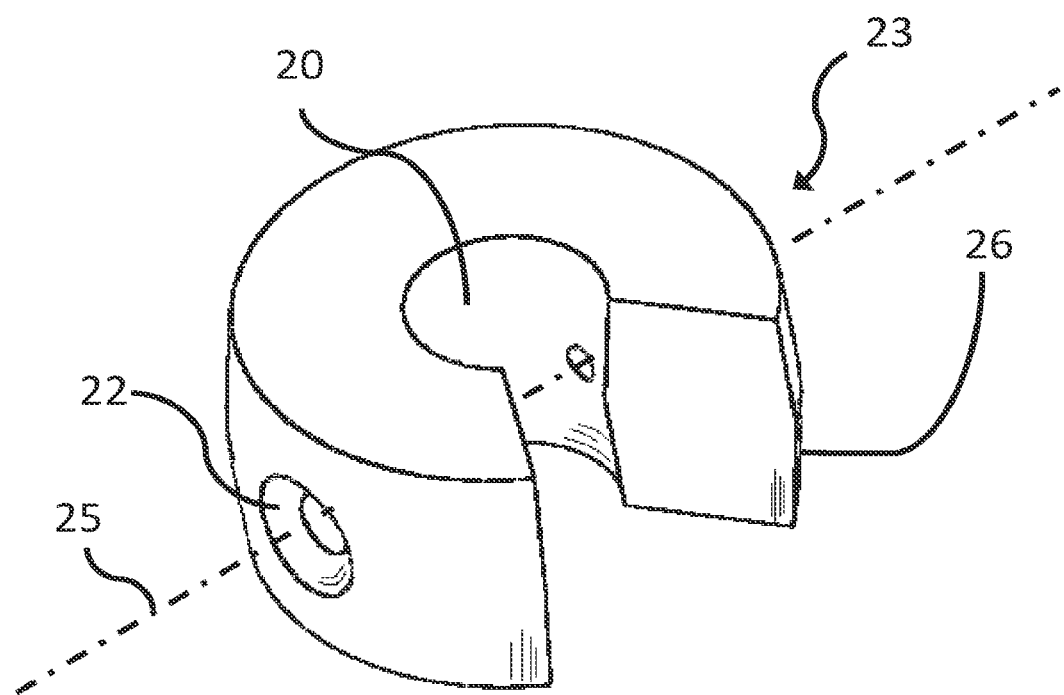
FIG. 8 is an isometric view of a body fractionally around the cavity.

Three general examples of the "body" are presented. Body 21 in FIG. 7 completely surrounds cavity 20—which is where chew 5 is insertable. Body 21 is most preferred during testing because it has the ability to roll easily during play with the animal. Body-fractional 26 in FIG. 8 illustrates how cavity 20 need not be circumferentially surrounded; rather a portion on the side of cavity 20 may be exposed. For clarity, the terms "around", "surrounds", and the like apply to both body 21 and body-fractional 26 since greater than half of the chew is "surrounded" by the body. Body-closed 27 in FIG. 9 has closed off one side of cavity 20 with closed section 28. The combination of device 60 with a chew is labeled as device-with-chew 61. The advantage of body-closed 27 is that the user can grasp closed section 28 and play tug-of-war with the animal.

Figure 9:
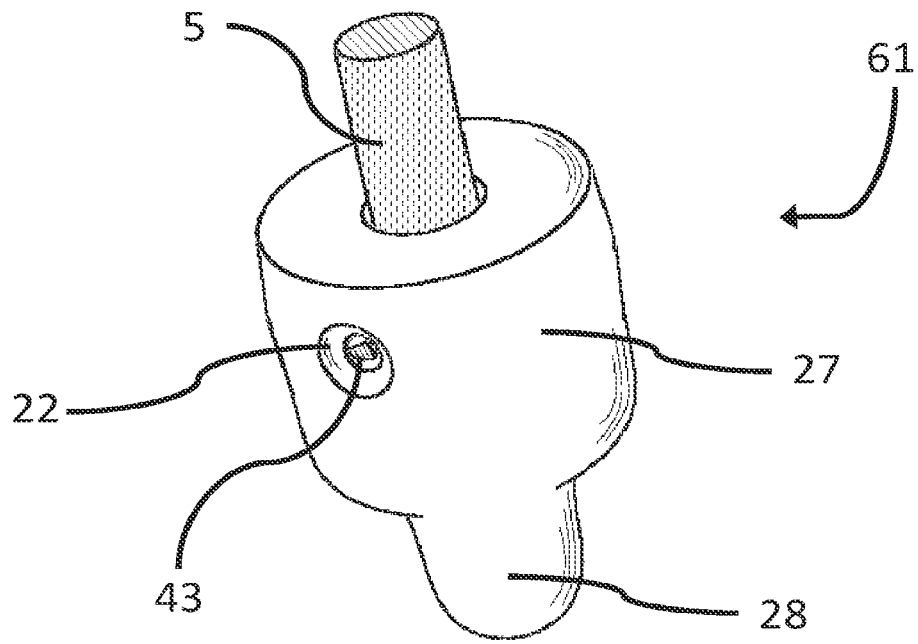
FIG. 9 is an isometric view of the device with a closed section that is securing a chew.

Bodies 21, 26 and 27 are non-limiting examples and each possess first passageway 22 and second passageway 23 that are aligned along axis 25. Axis 25 passes across the generally circular shape that is cavity 20, but cavity 20 may also exist in other shapes. In FIG. 7, the exterior of second passageway 23 cannot be seen, but the opening of second passageway 23 into cavity 20 is marked. In FIG. 9, example latch-sidearm 43 can be seen residing within first passageway 22.

Another feature is that the device of this invention be re-useable. That is, after chew 5 is consumed, pin 10 can be removed and another chew is installed. This requirement means that pin 10 must be inserted and removed multiple times; therefore, pin 10 should not irreversibly lock into the device. The latch element being moveable between an engagement position and release position allows for this requirement to be met.

Figure 10:
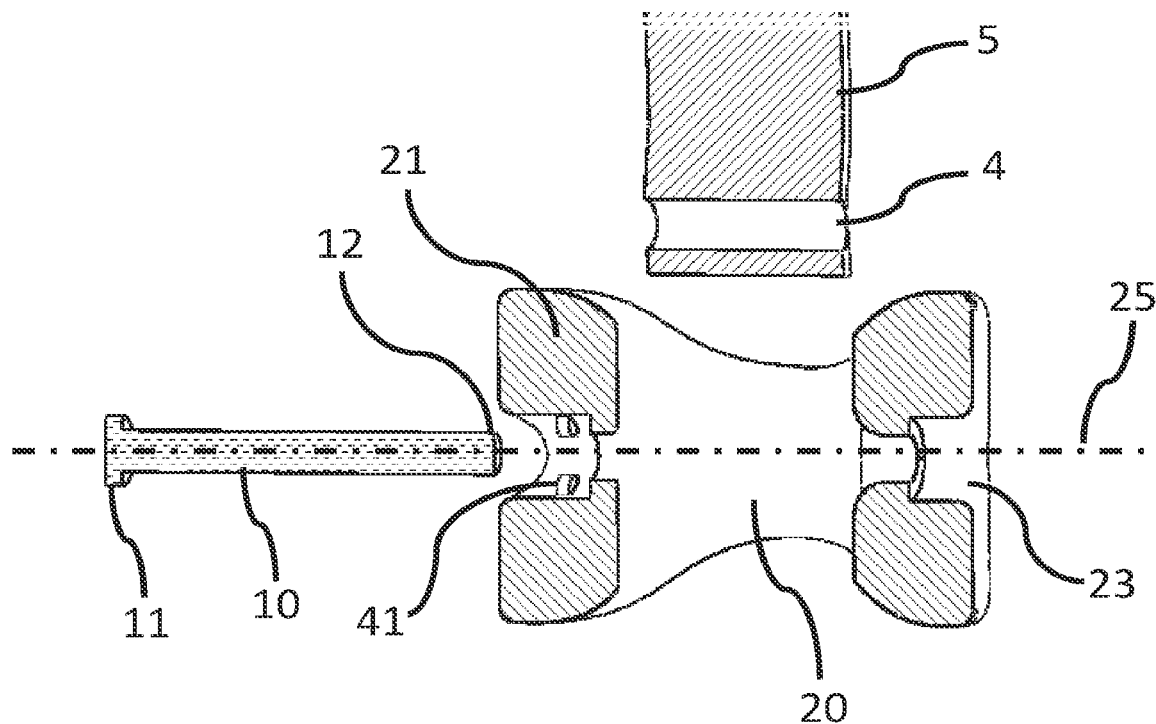
FIG. 10 is a cross-sectional view of the elements and a chew prior to assembly.

FIGS. 10 and 11 illustrate how the different elements of this invention interact to secure chew 5. In FIG. 10, pin 10 is removed from body 21. Chew 5 is ready to be inserted into cavity 20 so that borehole 4 can align with axis 25. Note that first passageway 22 and second passageway 23 are aligned along axis 25. Example latch-points 41 can be seen inside of first passageway 22 in this cross-sectional view. FIG. 11 shows how borehole 4 is aligned along axis 25, and then the pin is inserted along axis 25. First insertion end 12 passes through first passageway 22, then borehole 4, before ending in second passageway 23. At this point, head 11 has pushed past latch-points 41, and is therefore secured by latch-points 41. Latch-points 41 is also marked in FIG. 11 by its physical position as latch engagement position 46 since latch-points 41 is engaged with head 11 and is restricting removal of pin 10. While not illustrated, pin 10 does not have to fully exit first passageway 22 for this invention to function. Rather pin 10 can be retained within first passageway 22 during the addition of chew 5.

The mechanism that secures the chew should not be significantly damaged by the animal. One prototype had a hard nylon piece flush to the exterior of the rubber ring. The animal appeared to notice the difference in texture between the nylon and the rubber and focused teething action on that spot. Therefore, it is preferred that parts are recessed within first passageway 22 and second passageway 23. For example, note in FIG. 11 that insertion end 12, head 11, and latch-points 41 are recessed from the exterior of body 21.

The user should not have to use a tool in order to add a fresh chew 5 to device 60. This eliminates requiring the user to use screwdrivers or pliers. Conventional bolts and screws are eliminated by this constraint. A plastic thumb screw/bolt that is threaded would meet this constraint; however, in practice pin threads either become damaged or become clogged with dried chew residue. The damaged or clogged threads are too difficult to operate without the assistance of a tool. The use of a pencil, stick, or other similar simple item to help a user press on a component (e.g., a latch or pin) is not considered to be a tool.

Since head 11 should be recessed, yet no tools can be used to grasp head 11 for removal, a tool-free means to release pin 10 had to be devised. After experimentation a solution was devised—insertion end 12 of pin 10 must be moved inward toward cavity 20, which forces pin head 10 out of first passageway 22 so that it becomes accessible to fingers. Applying force on pin insertion end 12 provides the mechanism to free pin 10 regardless of the state or status of the chew.

A requirement of the device is that pin 10 should not be removed by the chewing action of the animal; that it, it must only be removed by purposeful action of the user. This constraint turned out to be the most difficult to achieve, and ultimately resulted in the use of a latch-based pin security system.

The initial prototypes made to meet this constraint relied on a frictional force to hold pin in the ring body. That is, pin 10 diameter nearly matched the narrow most diameter of first passageway 22 and the friction between the walls held pin 10 in place. However, this design was defeated by the animal by their chewing action. In one experiment, the animal was observed chewing such that their lower canine was entering second passageway 23 and repeatedly pressing on pin insertion end 12. This repeated pressing action slowly worked head 11 out of first passageway 22. Then when the animal changed chewing positions, it grasped pin head 11 with its teeth and pulled pin 10 completely free. In another defeat mechanism, as the animal tugged on chew 5; that repeated action also slowly worked pin 10 loose despite the frictional forces. Thus a friction-only approach will not meet this constraint. A threshold level force must be achieved to release pin 10, which is best met by the use of a latch.

A number of different designs were considered and tested for the latch element. They are each provided with a different number for clarity, but they are all considered a "latch" for the purposes of this invention and should be considered non-limiting.

The first prototype was created that used a latch was latch-points 41 and it engaged with pin head 11 with a transient force. Latch-points 41 provided a threshold resistance force that must be overcome when pin 10 is pushed in the removal direction either by the animal tugging on the chew or by the user's finger. The hypothesis (that has generally proven true) was that the user could push pin head outward past the latch with reasonable effort, but that a repeated less forceful action of the animal would not be able to overcome the threshold force to free pin head 11 past latch-points 41.

Figure 12:
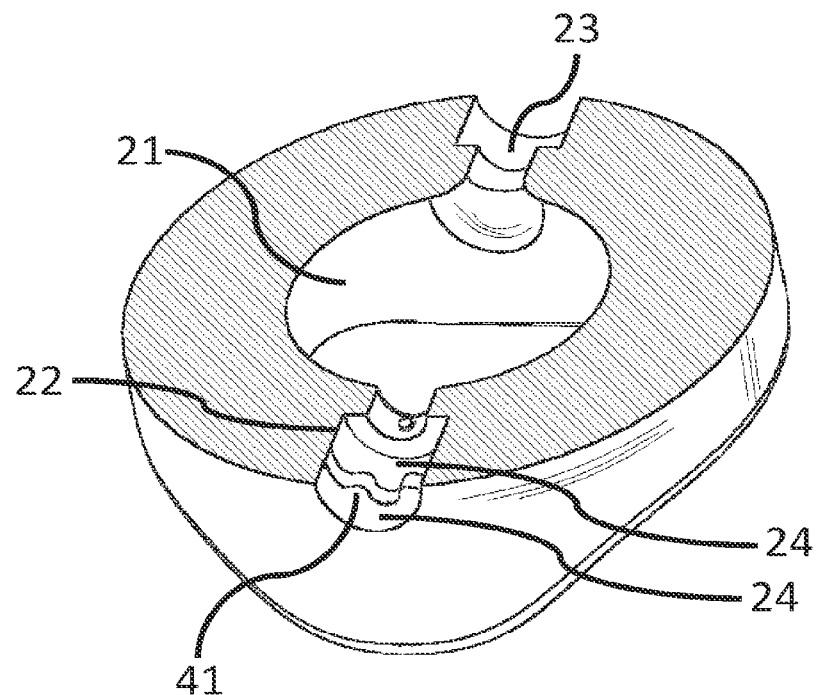
FIG. 12 is a cross-sectional view of a body with a latch (of latch-points configuration).
Figure 13:
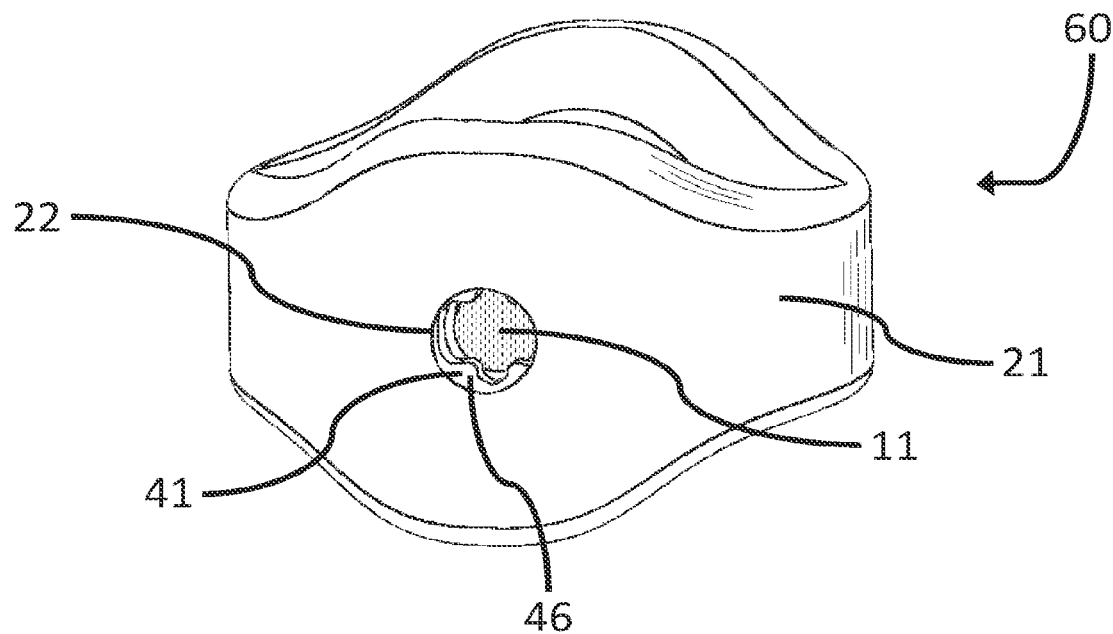
FIG. 13 is an isometric view of the device with a latch (of latch-points configuration).

In one instance, latch-points 41 was created from a disk of rubber with four square points. This version of latch-points 41 is not illustrated, but is similar to the curved representation of latch-points 41 in within first passageway 22 of FIGS. 12 and 13. Since FIG. 13 illustrates body 21 with pin 10 installed, it is referenced as device 60 of this invention. The points of latch-points 41 made an opening of a slightly smaller innermost diameter than that of the outer diameter of head 11. When pin 10 was inserted into the device, pin head 11 was able to readily push the four points of latch-points 41 inward into a latch fold zone 24 until head 11 was past their deflection point. At this position, head 11 was secure in the first passageway 22 and the latch-points 41 was in its natural latch engagement position 46, which engaged with and blocked pin head 11. This prototype passed functional testing with the dog in that chew 5 was consumed and pin 10 was not accidentally removed. This positive result was repeated with additional prototypes. To remove pin 10, insertion end 12 is pressed until pin head 11 was able to deflect the points of latch-points 41 into a latch fold zone 24, so that latch-points 41 was in latch release position 47 and head 11 could pass past latch-points 41.

The force required to insert and remove pin 10 was measured. To remove pin 10, force must be applied by the user's finger on pin insertion end 12 (which was generally 0.25 inch in diameter). Over several measurements, the force required to release head 11 past latch-points 41 was between 2100 and 3300 grams force depending on the exact diameter of head 11. This level of pressure was momentarily uncomfortable on the tip of the user's finger; thus making this design functional, but not preferred.

Figure 14:
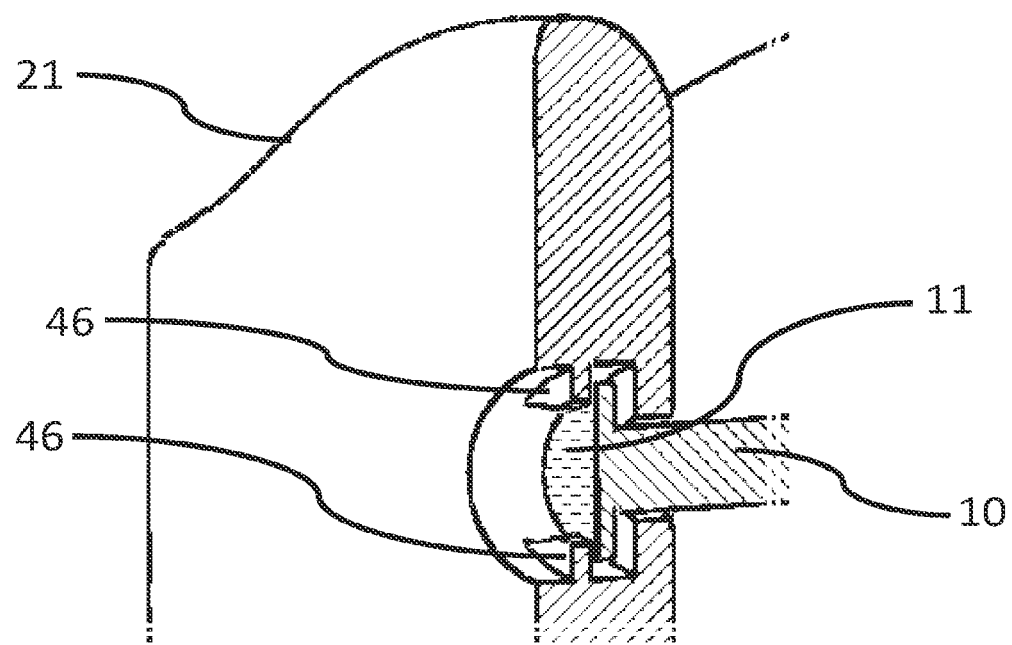
FIG. 14 is a close-up cross-sectional view of a latch (of latch-points configuration) in the latch engagement position with a pin head.
Figure 15:
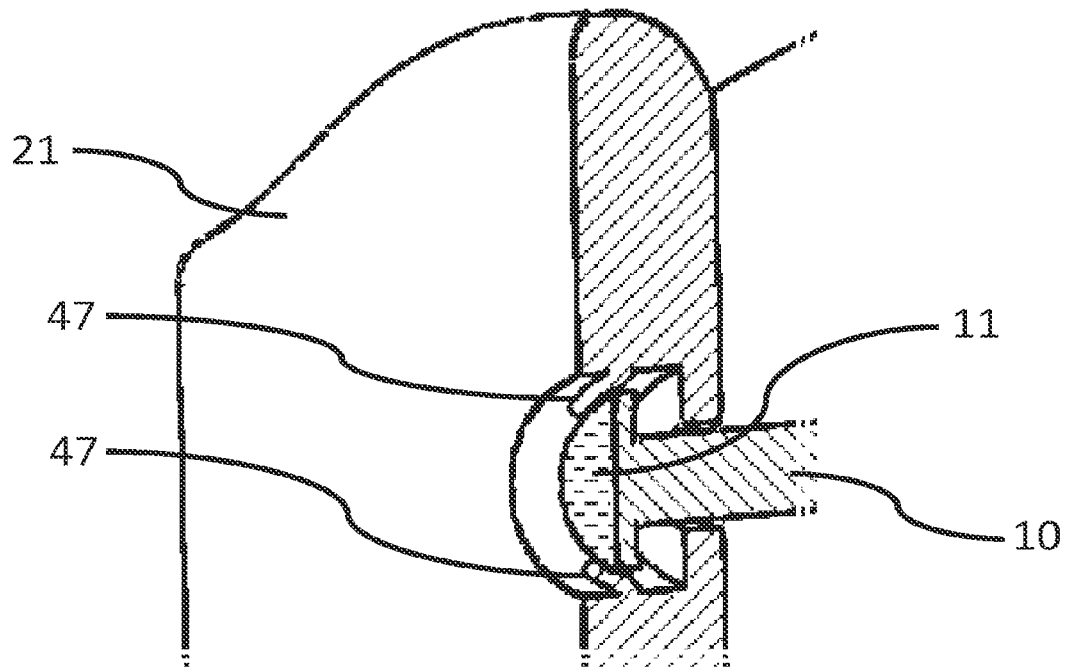
FIG. 15 is a close-up cross-sectional view of a latch (of latch-points configuration) in the latch release position with a pin head.

FIGS. 14 and 15 provide a close-up view of latch-points 41 in action. In FIG. 14, pin 10 is deeper within first passageway 22 and latch-points 41 is in latch engagement position 46 where it prevents pin 10 from removal. In FIG. 15, pin 10 in is the process of being removed: latch-points 41 has been moved into latch release position 47 by utilizing latch fold zone 24.

In order to reduce the force on user's fingertip when pressing on pin insertion end 12 for pin 10 removal, another prototype was tested and measured. In this instance, latch-points 41 was created from a disk that had four triangular points that engaged with head 11. Since the points were smaller, the force for removal was also reduced. The measurements confirmed this by showing that the removal force required on pin insertion end 12 was only 550-730 grams force. This removal force was comfortable to the user's finger. Unfortunately, this force level was too low to pass animal testing. Repeatedly, during the action of tugging on chew 5, pin 10 would get dragged with enough force in the removal direction that the head 11 would pop out past latch-points 41. By careful observation, the apparent mechanism of pin 10 retainment defeat was determined. When tugging on chew 5, the animal would sometimes grasp and pull chew 5 in the direction of head 11. This force along axis 25 would occasionally be great enough to overcome latch-points 41, and release head 11. Therefore a removal force greater than 730 grams force is preferred.

While single action latch similar to latch-points 41 functions acceptably (with a force between 730 to 3300 grams force (7.2 to 32.4 Newtons)), it is not the preferred latch design. Rather, a double-action latch was envisioned that requires the user to move the latch from latch engagement position 46 to latch release position 47 while applying direct or indirect force to (i.e. pressing on) pin insertion end 12 to remove pin 10. Thus, a high force would need to be applied by the chewing animal to overcome pin 10 retainment, but a small force would need to be applied by the user with a dual action system. Since a bistable latch (i.e. locking latch) is more expensive and complicated, the preferred latch is elastomeric based—that is, it resumes its engagement position as soon as the user stops pushing on it. Since the latch must be moved into the latch release position 47 via the latch fold zone 24, while pin insertion end 12 is pushed, pin 10 removal is therefore a double-action process. Once pin head 11 is past latch release position 47, the user may grasp head 11 for pin 10 removal.

Figure 16:
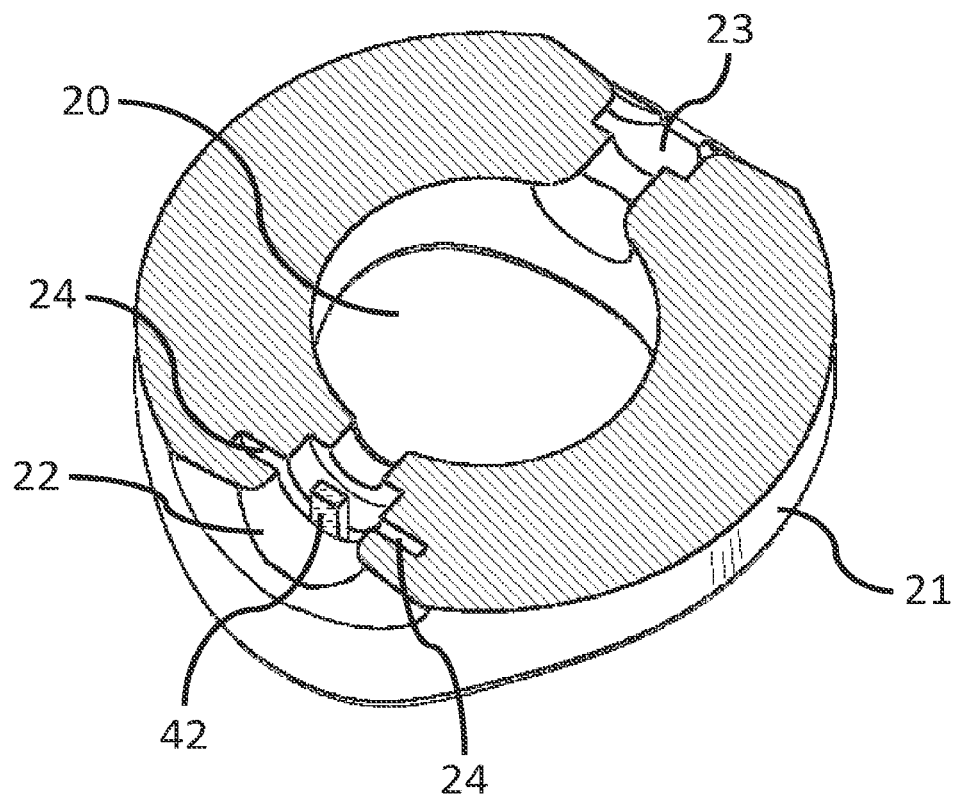
FIG. 16 is a cross-sectional view of a body with a latch (of latch-centerbar configuration) in the first passageway with a latch fold zone on either side of the latch.

For another prototype, latch-centerbar 42 in FIG. 16 was fabricated as a rectangular bar. On either side of latch-centerbar 42 are a latch fold zone 24. When latch-centerbar 42 is moved into either latch fold zone 24, latch-centerbar 42 is considered to be in the latch release position 47. The bar of latch-centerbar 42 was thick enough and wide enough that if pin insertion end 12 was pushed without moving latch-centerbar 42 into latch release position 47, head 11 would need to severely compress the rubber material of latch-centerbar 42 against the interior surface of first passageway 22. Force numbers were not recorded on this latch-centerbar 42 iteration, but the force was significantly uncomfortable to the finger and probably exceeded the earlier force value of 3300 grams force if pin 10 was forced to be removed while latch-centerbar 42 was still in latch engagement position 46. However, when latch-centerbar 42 was moved into latch release position 47 via either latch fold zone 24, pin head 11 almost freely moved out of first passageway 22 by light finger pressure on pin insertion end 12. Again the force value was not recorded, but was certainly less than 1000 grams force. While this latch design worked well, other designs were also investigated as detailed below.

Figure 17:
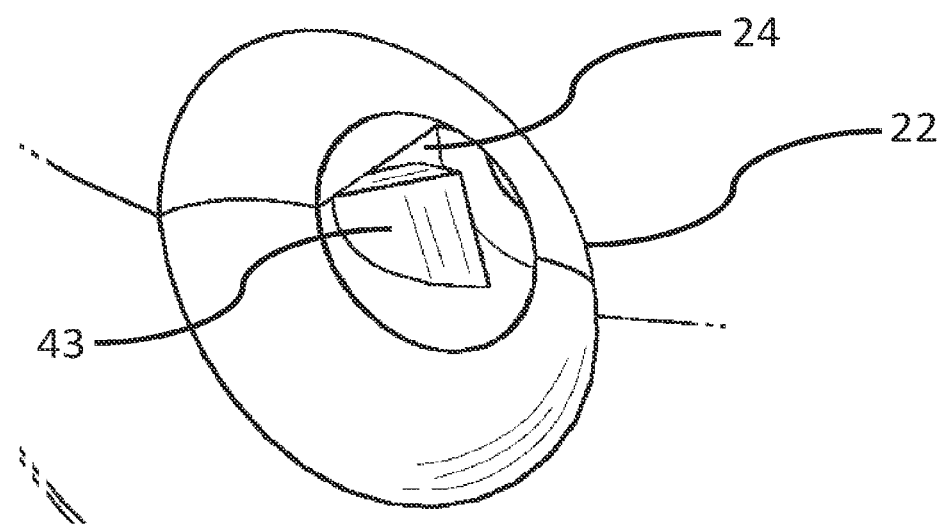
FIG. 17 is a close-up view a latch (of latch-sidearm configuration).
Figure 18:
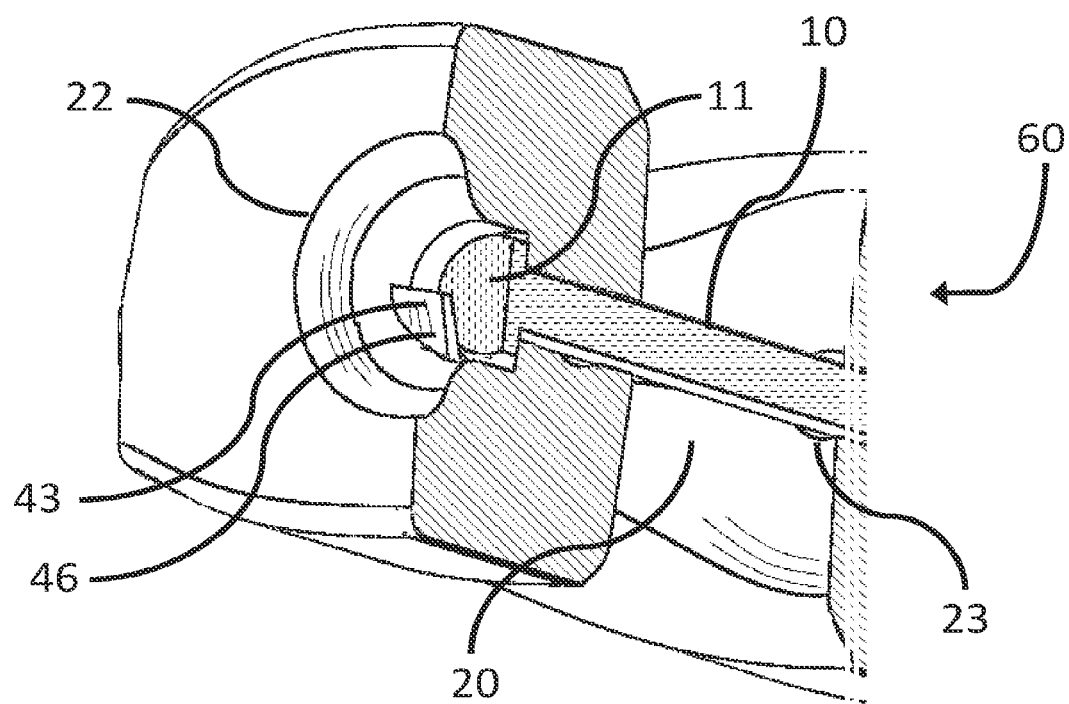
FIG. 18 is a cross-sectional view of a latch (of latch-sidearm configuration) in the latch engagement position with a pin head.
Figure 19:
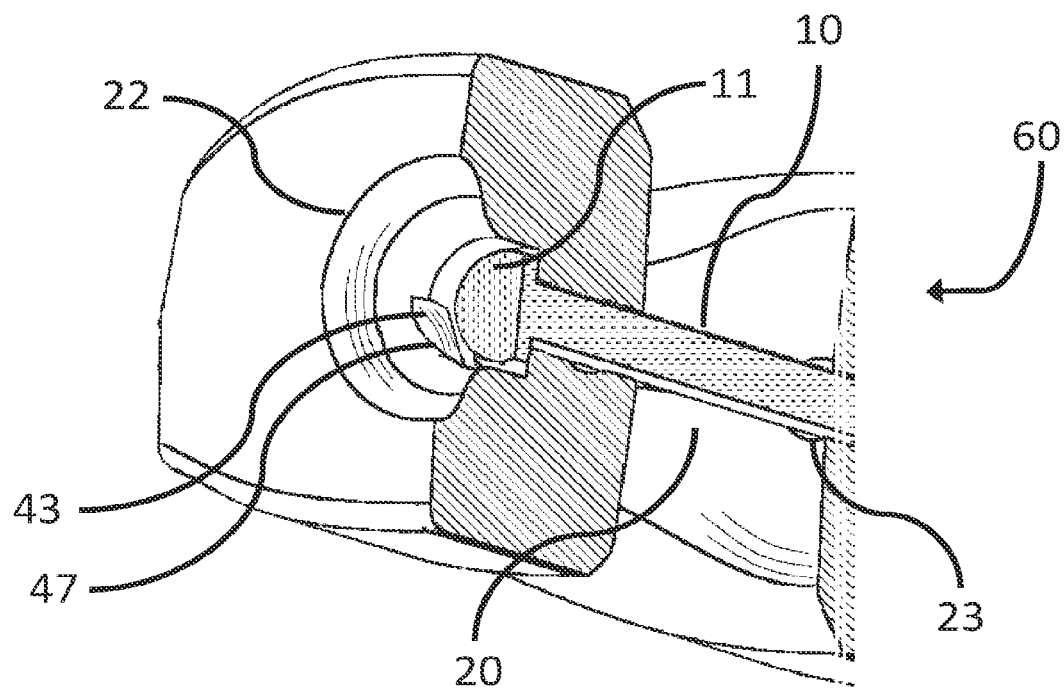
FIG. 19 is a cross-sectional view of a latch (of latch-sidearm configuration) in the latch release position with a pin head.

In another instance, (FIG. 17) latch-sidearm 43 is another design that can be moved by the user's finger into latch fold zone 24, while simultaneously using another finger to press on pin insertion end 12. A large number of prototypes were successfully made and tested using latch-sidearm 43. To make latch-sidearm 43 easy to manufacture, it was molded as a part of body 21. Force measurements were made across six different prototypes. The variations across the prototypes included the durometer of the latch-sidearm 43 (nominally 85A durometer, but difference in hardness between the prototypes was noticeable based on the exact mix ratio of the rubber components), the degree of engagement of latch-sidearm 43 with pin head 11, and the diameter of pin head 11. The force for pin 10 removal without a finger moving latch-sidearm 43 into latch release position 47 via latch fold zone 24 was recorded. While latch-sidearm 43 was still in latch engagement position 46 (as shown in FIG. 18), it took between 1600 to 3500 grams force on pin insertion end 12 to remove pin 10. All these prototypes passed animal chew testing without any pin removal failures. In these prototypes, when latch-sidearm 43 was pushed completely into latch fold zone 24 and latch release position 47 (as shown in FIG. 19), pin 10 removal force was 500 to 600 grams force. If latch-sidearm 43 was not completely pushed aside into latch fold zone 24, and there was still a small degree of engagement with the pin head 11, latch-sidearm 43 is still considered to be in latch release position 47 because in these instances the force number for removal of the pin head 11 ranged from 980 to 2000 grams force.

In the instances detailed above, a number of force numbers in different situations were presented. Table 1 captures these force numbers with notes for easy review. From the values it can be seen that the point at which the latch fails animal testing is between 730 and 1600 grams force. While the exact value is unknown, the force to release pin head 11 without the user simultaneously moving the latch (e.g., latch-sidearms 43) into latch release position 47 should be a minimum of 800 grams force, with the preferred minimum of 1000 grams force, and a force >1600 grams force is most preferred. Also, since a force of >2000 grams force on a 0.25" pin insertion end 12 is uncomfortable to a fingertip, it is preferred that a finger-moveable latch (e.g. latch-centerbar 42 and latch-sidearm 43) be used so that the manually moving a latch from latch engagement position 46 into latch release position 47 allows for a comfortable force (<2000 grams force) to free pin head 11, with a most preferred force of <800 grams force.

TABLE 1

Removal Force Measurements (in grams force on pin insertion end 12)

| Latch Design | Did animal remove pin 10? | Force if latch is in latch engagement position 46 | Force if user fully moves latch into latch release position 47 | Force if user incompletely moves latch into latch release position 47 |
|---|---|---|---|---|
| Latch-points 41 with square points | No | 2100-3300 | n/a | n/a |
| Latch-points 41 with triangular points | Yes | 550-730 | n/a | n/a |
| Latch-centerbar 42 | No | >3300 (est.) | <1000 (est.) | n/m |
| Latch-sidearm 43 | No | 1600-3500 | 500-600 | 980-2000 |
| Latch-centerpost 48 | No | 1800-4000+ | 100-200 | n/m | n/a = not applicable.
n/m = not measured.

Figure 20:
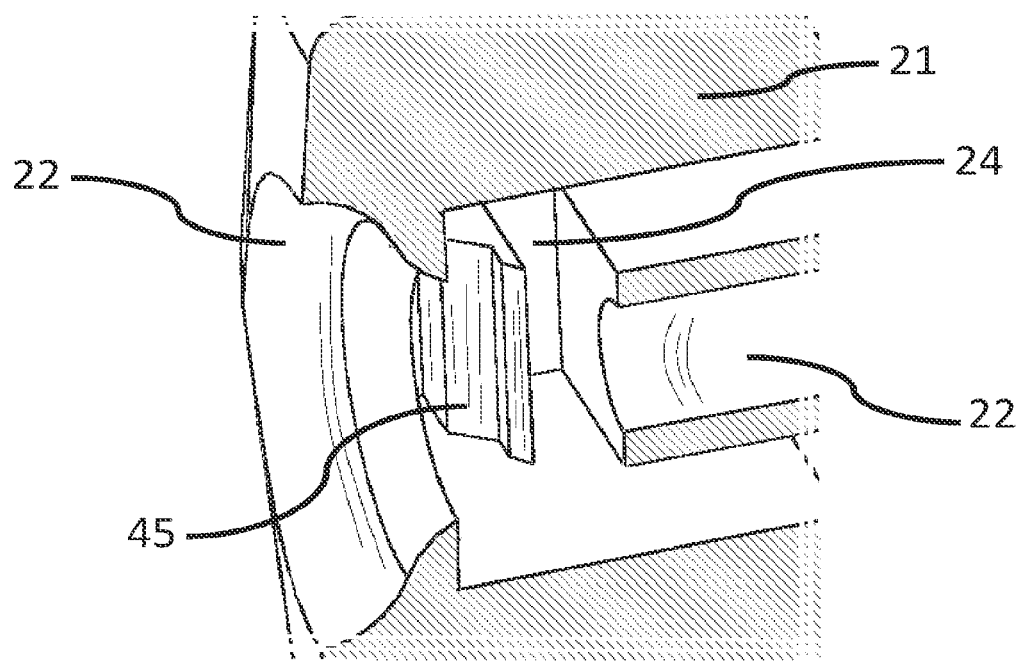
FIG. 20 is a cross-sectional view of a latch (of latch-full-sidearm configuration).
Figure 21:
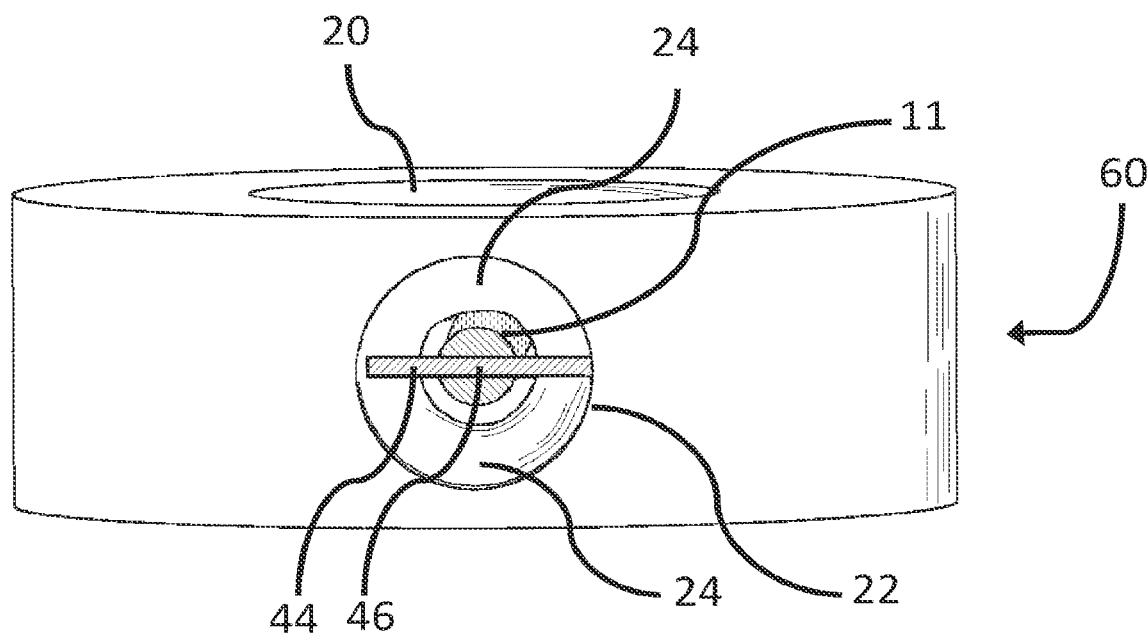
FIG. 21 is a face-on view of a latch (of latch-elastic-band configuration) in the latch engagement position with a pin head.

FIG. 20 presents latch-full-sidearm 45 of another design that passed prototype testing. Latch fold zone 24 is adjacent to latch-full-sidearm 45 within first passageway 22. FIG. 21 presents another successfully tested design: latch-elastic-band 44. As shown, latch-elastic-band 44 of device 60 is shown in latch engagement position 46 with head 11. For pin 15 removal, latch-elastic-band 44 must be moved by the used into either latch fold zone 24, which in this illustration are above and below head 11 in first passageway 22. If pin 15 removal is attempted while latch-elastic-band 44 is still in latch engagement position 46, the elastic must be severely stretched and deflected with undue force. Force measurement numbers were not made with latch-full-sidearm 45 or latch-elastic-band 44.

Figure 22:
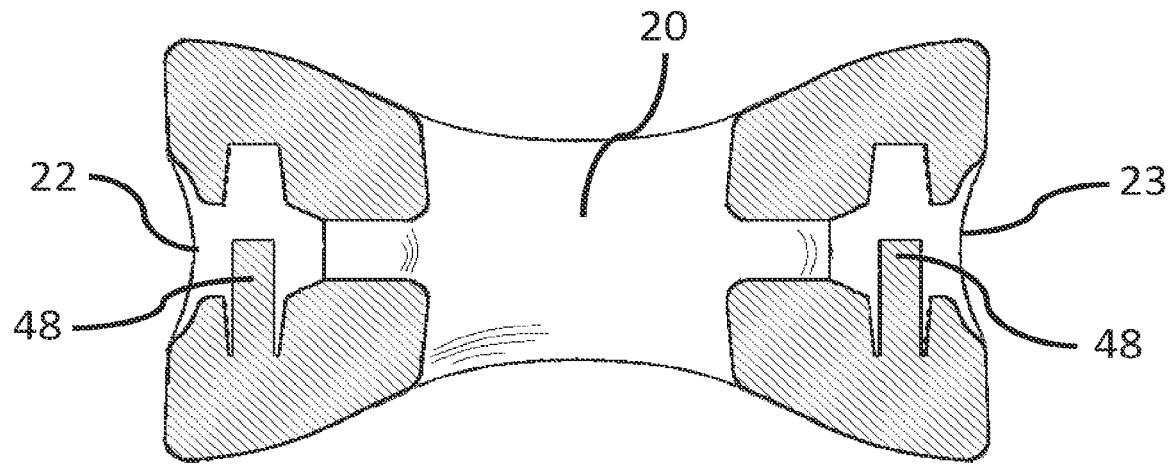
FIG. 22 is a cross-sectional view of a body with a latch (of latch-centerpost configuration) in both passageways.
Figure 23:
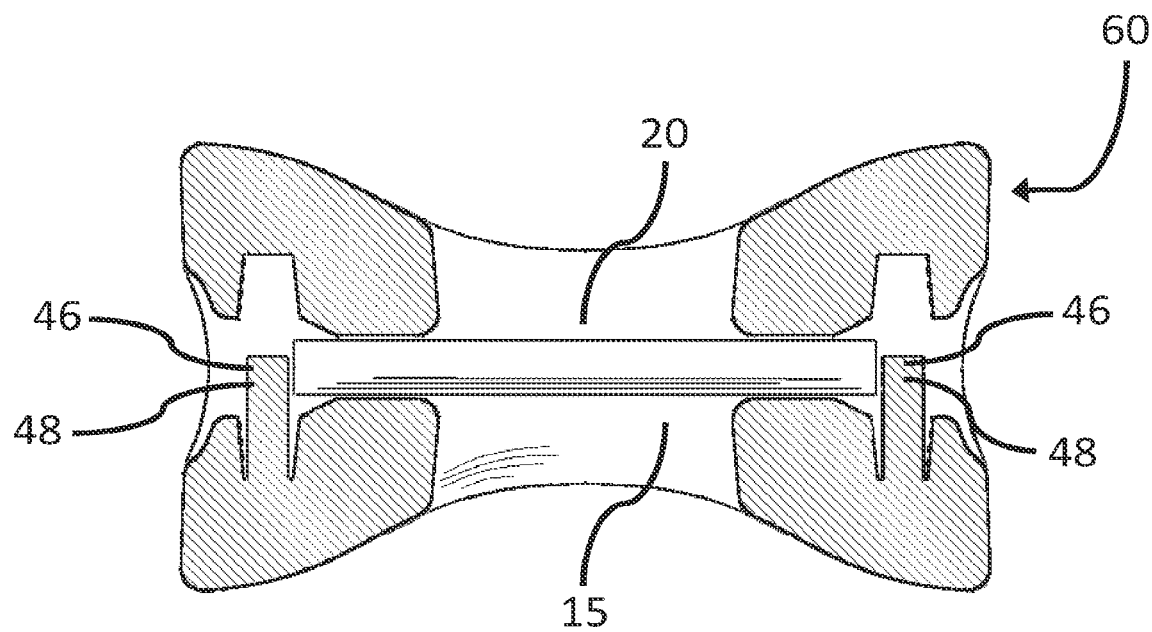
FIG. 23 is a cross-sectional view of a device with a latch (of latch-centerpost configuration) in both passageways in which are in the latch engagement position.
Figure 24:
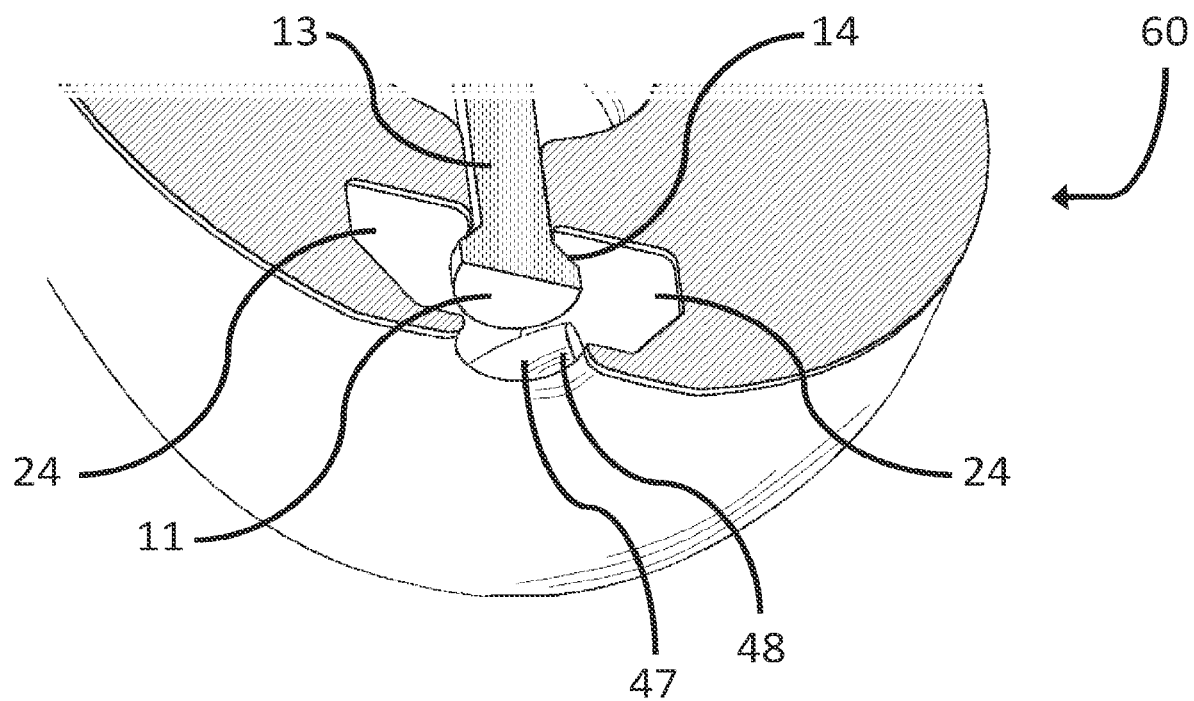
FIG. 24 is a cross-sectional view of a device with a latch (of latch-centerpost configuration) in the latch release position with a pin.
Figure 25:
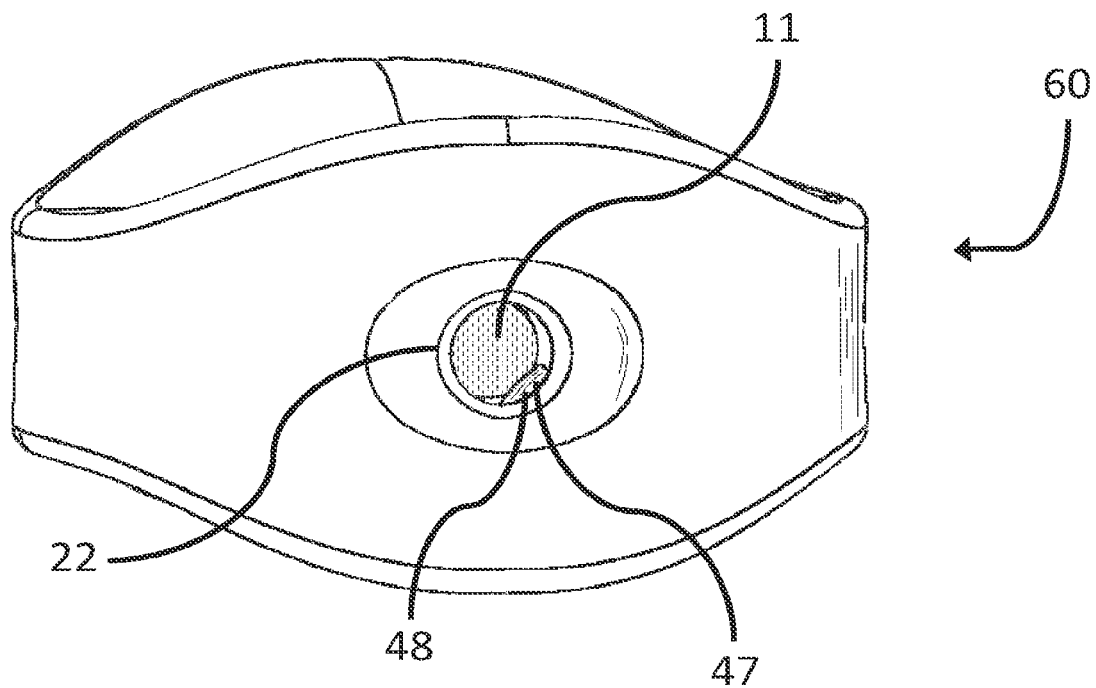
FIG. 25 is a face-on view of a device with a latch (of latch-centerpost configuration) in the latch release position with a pin.

A third latching mechanism, latch-centerpost 48 is illustrated in FIGS. 22, 23, 24, and 25. Latch-centerpost 48 was produced in two different forms by using 3.2 and 4.8 mm diameter rubber rod. By mounting the rod into first passageway 22, latch-centerpost 48 was created. FIGS. 22 and 23 have latch-centerpost 48 in the latch engagement position 46, where the latch-centerpost 48 blocks pin head 11. FIGS. 24 and 25 show how latch-centerpost 48 is moveable into latch fold zone 24 so that it is in latch release position 47. Also, note how latch-centerpost 48 can work with a variety of pin designs: in FIG. 23, pin-flush-head 15 is installed, while in FIG. 24 pin-taper 13 is apparent.

Another preferred feature is that the latch element is easily deflected by pin 13 into the latch fold zone 24 for ease of insertion. Focusing on FIG. 24, as pin-taper 13 was being inserted into body 21, head 11 must push latch-centerpost 48 into either latch fold zone 24. Tapered portion 14 eases how latch-centerpost 48 is moved aside by the pin and reduces the installation force. Complementing this approach, is how pin-flush-head 15 is installed in device 60 as illustrated in FIG. 23. During installation of pin-flush-head 15 past latch-centerpost 48, since head 11 doesn't have a large increase in diameter, pin-flush-head 15 can more easily move latch-centerpost 48 into latch fold zone 24 and hold it in position in latch fold zone 24 until pin insertion is completed and latch-centerpost 48 moves back into latch engagement position 46.

Figure 26:
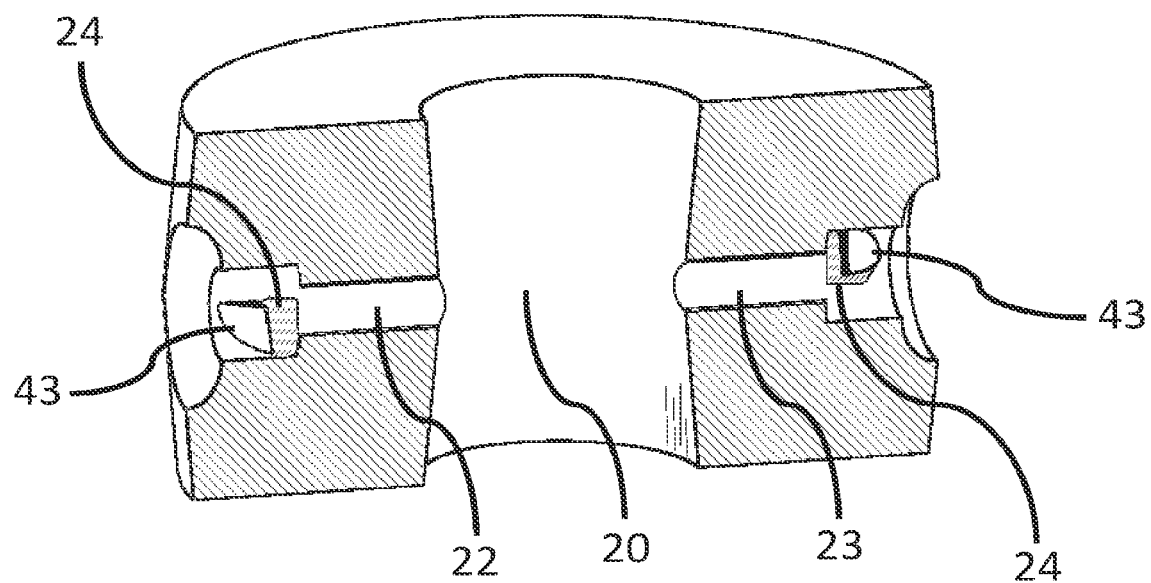
FIG. 26 is a cross-sectional view of a body with a latch (of latch-sidearm configuration) in both passageways.
Figure 27:
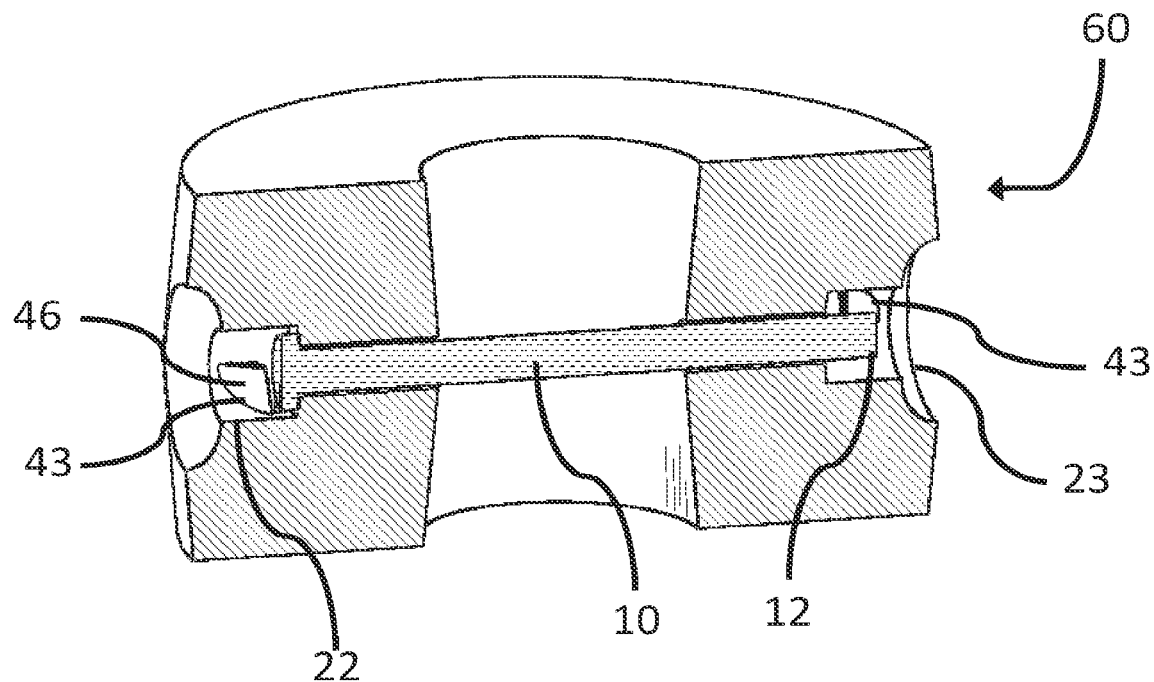
FIG. 27 is a cross-sectional view of a device with a latch (of latch-sidearm configuration) in both passageways.

Another preferred feature of the invention is for first passageway 22 to be functionally identical to second passageway 23. That is, pin 10 is insertable into either first passageway 22 or second passageway 23. This feature provides the benefit that the user doesn't have to inspect for differences in the passageways—either passageway can be used. FIGS. 22 and 23 are examples of this preferred mechanism. Note how first passageway 22 and second passageway 23 are interchangeable. While FIG. 23 shows this feature with pin-flush-head 15, which is also symmetrical, pin 10 or pin-taper 13 can also function in this design and have been successfully tested as prototypes. Note that in FIG. 23 for the user to remove pin-flush-head 15, the user first moves either latch-centerpost 48 into one of the latch fold zones 24. Then to free pin-flush-head 15, the user pushes indirectly on the opposite end of pin-flush-head 15, now considered to be the pin insertion end 12. That is, the user pushes on the other latch-centerpost 48, the one that is still in the latch engagement position 46 form, which pushes pin insertion end 12 toward cavity 20. FIGS. 26 and 27 show another unit that has nearly identical passageways (first passageway 22 and second passageway 23). As viewed, pin 10 could be inserted into either the left-hand side of 21, or the right-hand side. FIG. 27 shows the result of pin 10 being inserted into the left-hand side of body 21. Then by definition, this left-hand passage is first passageway 22.

Figure 28:
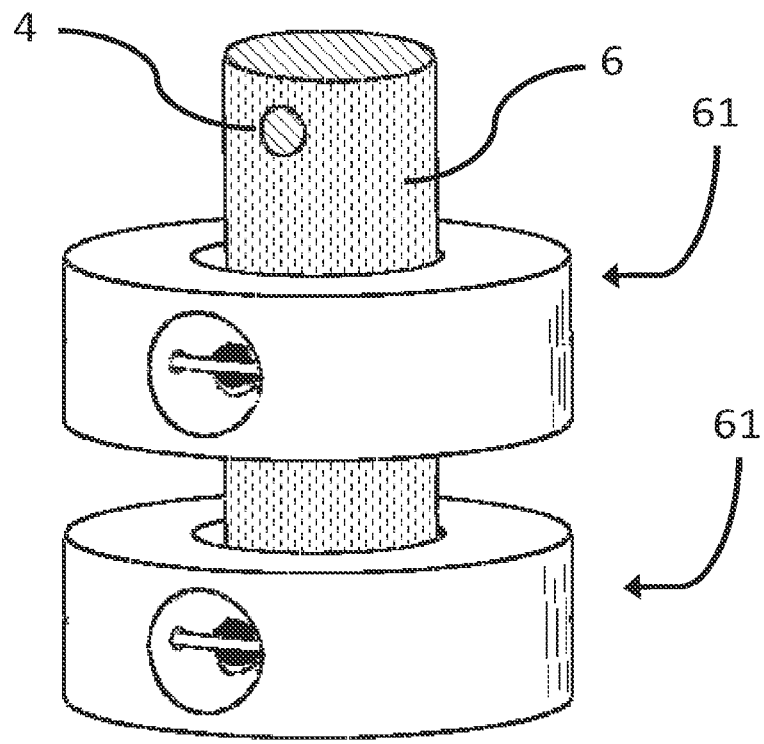
FIG. 28 is a side view of two devices securing a chew with multiple boreholes.

Another desirable feature of this invention is that device 60 allow chew 5 to be inserted into cavity 20 from either face of body 21. However, each face of device 60 need not be identical. In fact, one side may be deeper that the other, which gives the caretaker options for mounting chew 5 that sets how much edible material 1 is exposed to easier chewing action. Also, FIG. 28 presents another preferred design benefit for body 21. Chew-multiborehole 6 can now have more than one device-with-chew 61 along the length of chew-multiborehole 6. This feature gives the animal caretaker more options for occupying the animal.

Figure 29:
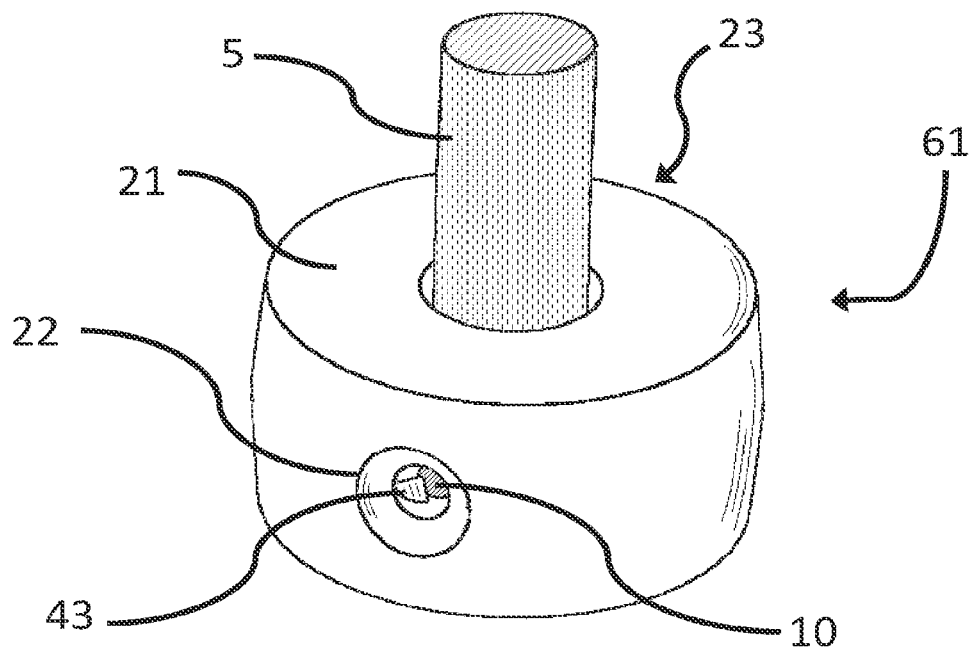
FIG. 29 is an orthogonal view of the preferred device with a chew.

At the time of this filing, the most preferred device, based on amount of successful testing and manufacturability, is presented in FIG. 29. Body 21 has latch-sidearm 43 in first passageway 22 and latch-sidearm 43 in second passageway 23, and uses pin 10, which pass through borehole 4 in chew 5.

Since installing a chew into the device requires action by a user, the text above also describes a method for using the elements of this invention. For example, referencing FIG. 10, the user may insert chew 5 into cavity 20 so that borehole 4 is approximately aligned with axis 25. Pin 10 may already be residing in first passageway 22 during this operation, but if not, the user begins pin 10 insertion by pushing pin insertion end 11 into first passageway 22. Then the user further inserts pin 10 so that insertion end 11 passes through borehole 4 and into second passageway 23. The user stops inserting pin 10 once pin head 11 has pushed past latch 41. Latch 41 is now in latch engagement position 46 as seen in FIG. 11. Buy pressing on insertion end 11, the user may remove pin 10.

I Claim:

1. A device for securing a chew, comprising:
a body defining a cavity, the cavity is configured to receive a consumable dog chew, the chew includes at least one borehole;
a first passageway disposed with the body and in communication with the cavity, the first passageway defines a first axis;
a second passageway disposed with the body and oriented in the body opposite the first passageway and in communication with the cavity forming a channel, the second passageway defines a second axis, wherein the first axis is collinear with the second axis;
a pin including a head and an insertion end, the pin is configured for orientation within the channel such that the head is positioned within the first passageway; and
a latch disposed with the first passageway, wherein the latch is moveable between an engagement position and a release position, in the engagement position the latch is oriented to block the head from exiting the first passageway to restrict movement along the axes and removal of the pin, in the release position the latch requires an external force applied to the latch in an orthogonal direction relative to the axes to move the latch out of the blocking orientation to allow for removal of the pin to release the chew.

2. The device of claim 1 wherein the head is removeable from the first passageway when the latch is moved into the release position.

3. The device of claim 1 wherein the pin is releasably fixed within the first passageway when the latch is in the engagement position.

4. The device of claim 3 wherein when the pin is releasably fixed within the first passageway, a force of greater than 800 grams is required to disengage the pin from the body.

5. The device of claim 1 wherein the first passageway includes a latch fold zone that is approximately orthogonal to the first axis, the latch fold zone is configured to receive a portion of latch when the latch is moved into the release position for releasing the head of the pin.

6. The device of claim 1 wherein the pin is configured for insertion into the channel and through the borehole and the latch is oriented in the engagement position to restrict movement of the pin out of the channel.

7. The device of claim 1 wherein the dog chew is insertable through the cavity from either side of the body.

8. The device of claim 1 wherein the head is recessed within the first passageway, and the insertion end is recessed within the second passageway.

9. The device of claim 1 wherein the at least one borehole comprises a plurality of boreholes such that the dog chew is variably positionable relative to the body.

10. The device of claim 1 wherein the engaged pin head cannot be removed from the first passageway until the latch is moved from the engagement position to the release position by the external force applied to the latch, while a separate pin force is applied to the pin insertion end.

11. The device of claim 1 wherein the latch in the engagement position restricts removal of the pin head by a pin force applicable by a human finger to the pin insertion end, until the external force applied to the latch is applied by a human finger moves the latch to the release position.

* * * * *